US012664277B2

(12) United States Patent
Marks

(10) Patent No.: US 12,664,277 B2
(45) Date of Patent: Jun. 23, 2026

(54) MALWARE-RESISTANT COMPUTER SYSTEM MEMORY CAPTURE

(71) Applicant: Elta Systems Ltd., Ashdod (IL)

(72) Inventor: Yaniv Marks, Rehovot (IL)

(73) Assignee: Elta Systems Ltd., Ashdod (IL)

( * ) Notice: Subject to any disclaimer, the term of this patent is extended or adjusted under 35 U.S.C. 154(b) by 283 days.

(21) Appl. No.: 18/199,582

(22) Filed: May 19, 2023

(65) Prior Publication Data

US 2023/0376596 A1     Nov. 23, 2023

(30) Foreign Application Priority Data

May 22, 2022     (IL) .......................................... 293245

(51) Int. Cl.
*G06F 21/56*          (2013.01)
*G06F 11/1446*        (2026.01)
(Continued)

(52) U.S. Cl.
CPC ........ *G06F 21/566* (2013.01); *G06F 11/1458* (2013.01); *G06F 12/14* (2013.01);
(Continued)

(58) Field of Classification Search
CPC .. G06F 21/566; G06F 11/1458; G06F 21/554; G06F 2201/805; G06F 2221/034; G06F 11/2071; G06F 21/567
See application file for complete search history.

(56) References Cited

U.S. PATENT DOCUMENTS

| | | | |
|---|---|---|---|
| 9,383,934 B1* | 7/2016 | Lukacs ................. | G06F 3/0622 |
| 2006/0218439 A1* | 9/2006 | Carter-Schwendler ...................... | |
| | | | G06F 21/56 |
| | | | 714/E11.124 |

(Continued)

FOREIGN PATENT DOCUMENTS

| | | |
|---|---|---|
| KR | 100827287 B1 | 5/2008 |
| KR | 20160019250 A | 2/2016 |

OTHER PUBLICATIONS

SNIA: Solid State Storage Initiative, NVDIMM Technical Brief. Solving Data Volatility, Jan. 2014, SNIA: Smart Modular Technologies, pp. 4-6 (Year: 2014).*

(Continued)

*Primary Examiner* — Tim T Vo
(74) *Attorney, Agent, or Firm* — The Roy Gross Law Firm, LLC; Roy D. Gross

(57)          ABSTRACT

There is provided a computer system of malware-resistant memory capture, comprising memory units operably connected to a first processor; secondary-storage-enabled memory units (SSEMUs) comprising a backup memory, being adapted to copy stored data to the comprised backup memory, and providing a data interface of reading from the backup memory; wherein the first processor and the one or more SSEMUs are configurable so that each SSEMU of the one or more SSEMUs at least partially mirrors a respective memory unit of the one or more memory units; and a memory controller (MC) operably connected to a control interface and the provided data interface of at least one SSEMU, and configured to signal, to the SSEMU, a control interface signal of copying of stored data to a comprised backup memory, and initiate reading of data from the comprised backup memory.

9 Claims, 3 Drawing Sheets

(51) Int. Cl.
    *G06F 12/14*         (2006.01)
    *G06F 21/55*         (2013.01)

(52) U.S. Cl.
    CPC ...... *G06F 21/554* (2013.01); *G06F 2201/805*
            (2013.01); *G06F 2221/034* (2013.01)

(56) References Cited

U.S. PATENT DOCUMENTS

| | | | |
|---|---|---|---|
| 2011/0271143 A1 | 11/2011 | Cho et al. | |
| 2012/0131290 A1* | 5/2012 | Hamilton ............ | G06F 11/1662 |
| | | | 711/E12.103 |
| 2016/0342487 A1* | 11/2016 | Ware ........................ | G11C 7/20 |
| 2017/0109526 A1 | 4/2017 | Thadikaran et al. | |
| 2018/0075236 A1* | 3/2018 | Kwon ..................... | G06F 21/44 |

OTHER PUBLICATIONS

Embleton S. et al. "SMM Rootkits: A New Breed of OS Independent Malware" Article No. 11, pp. 1-12. https://doi.org/10.1145/1460877.1460892 Sep. 2008.

NVDIMM Technical Brief.Solving Data Volatility. Smart Modular Technologies. Jan. 2014 [https://www.snia.org/sites/default/files/NVDIMM%20Technical%20Brief%20January%202014.pdf].

Anthony E G Luck, Anil Agrawal. Address Range Partial Memory Mirroring. May 2016 [https://www.intel.com/content/www/us/en/developer/articles/technical/address-range-partial-memory-mirroring.html].

Israel Patent Office, Search Report—ILPO for Israeli Patent Application No. 293245, dated Jan. 27, 2025, 2pp.

* cited by examiner

Memory controller receives command from manager to capture memory
310

Memory controller signals NVDIMM to store memory to internal flash
320

Memory controller initiates transfer of stored memory data from internal flash to forensics server
330

Memory controller signals NVDIMM to resume mirroring operation
340

MALWARE-RESISTANT COMPUTER SYSTEM MEMORY CAPTURE

PRIORITY

This patent application claims the benefit of priority of Israeli Patent Application No. IL293245, filed May 22, 2022.

TECHNICAL FIELD

The presently disclosed subject matter relates to computer security, and in particular to system architectures of detecting advanced malware.

BACKGROUND

Problems of detecting malware have been recognized in the conventional art and various techniques have been developed to provide solutions.

GENERAL DESCRIPTION

According to one aspect of the presently disclosed subject matter there is provided a computer system of malware-resistant memory capture, the system comprising:

a) one or more memory units, each of the one or more memory units being operably connected to a first processor;

b) one or more secondary-storage-enabled memory units (SSEMUs), wherein each SSEMU:

i) comprises a backup memory, ii) is operably connected to the first processor and is configured to store data from the first processor, iii) is adapted to copy stored data to the comprised backup memory, responsive to, at least, a control interface signal, and iv) provides a data interface of reading from the backup memory;

wherein the first processor and the one or more SSEMUs are configurable so that each SSEMU of the one or more SSEMUs at least partially mirrors a respective memory unit of the one or more memory units; and c) a memory controller (MC) operably connected to a control interface and the provided data interface of at least one SSEMU, thereby giving rise to at least one controlled SSEMU, the MC configured to, for each of the at least one controlled SSEMUs:

a. signal, to the respective controlled SSEMU, a control interface signal of copying of stored data to a comprised backup memory, and b. initiate reading of data from the comprised backup memory.

In addition to the above features, the system according to this aspect of the presently disclosed subject matter can comprise one or more of features (i) to (viii) listed below, in any desired combination or permutation which is technically possible:

(i) the initiating reading of data comprises reading of data.

(ii) the initiating reading of data comprises signaling a direct memory access (DMA) controller to copy data from the backup memory of the respective controlled SSEMU to a storage device.

(iii) the MC is further configured to:

write data that was read from the comprised backup memory to a storage device.

(iv) the MC is further configured to:

perform forensic analysis on data read from the comprised backup memory of the respective SSEMU.

(v) the comprised backup memory of at least one SSEMU is flash memory.

(vi) at least one SSEMU is a non-volatile Dual In-line Memory Module (NVDIMM).

(vii) the provided data interface of at least one of the SSEMUs is a universal serial bus (USB) data interface.

(viii) the storage device is a server operably connected to the computer system via a computer network.

According to another aspect of the presently disclosed subject matter there is provided a computer-implemented method of malware-resistant memory capture, the method comprising:

a): signaling, to an SSEMU, a control interface signal of copying of stored data to a comprised backup memory, wherein the SSEMU:

i) comprises a backup memory, ii) is operably connected to a first processor and configured to store data from the first processor, iii) is adapted to copy stored data to the comprised backup memory, responsive to, at least, the control interface signal, and iv) provides a data interface of reading from the backup memory, and wherein the first processor and the SSEMU are configured such that the SSEMU at least partially mirrors a memory unit operably connected to the first processor; and b) initiating reading of data from the comprised backup memory.

This aspect of the disclosed subject matter can further optionally comprise one or more of features (i) to (viii) listed above with respect to the system, mutatis mutandis, in any desired combination or permutation which is technically possible.

According to another aspect of the presently disclosed subject matter there is provided a computer program product comprising a computer readable non-transitory storage medium containing program instructions, which program instructions when read by a processor, cause the processing circuitry to perform a method of of malware-resistant memory capture, the method comprising:

a) signaling, to an SSEMU, a control interface signal of copying of stored data to a comprised backup memory, wherein the SSEMU:

i) comprises a backup memory, ii) is operably connected to a first processor and configured to store data from the first processor, iii) is adapted to copy stored data to the comprised backup memory, responsive to, at least, the control interface signal, and iv) provides a data interface of reading from the backup memory, and wherein the first processor and the SSEMU are configured such that the SSEMU at least partially mirrors a memory unit operably connected to the first processor; and b) initiating reading of data from the comprised backup memory.

This aspect of the disclosed subject matter can further optionally comprise one or more of features (i) to (viii) listed above with respect to the system, mutatis mutandis, in any desired combination or permutation which is technically possible.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

Figure 1:
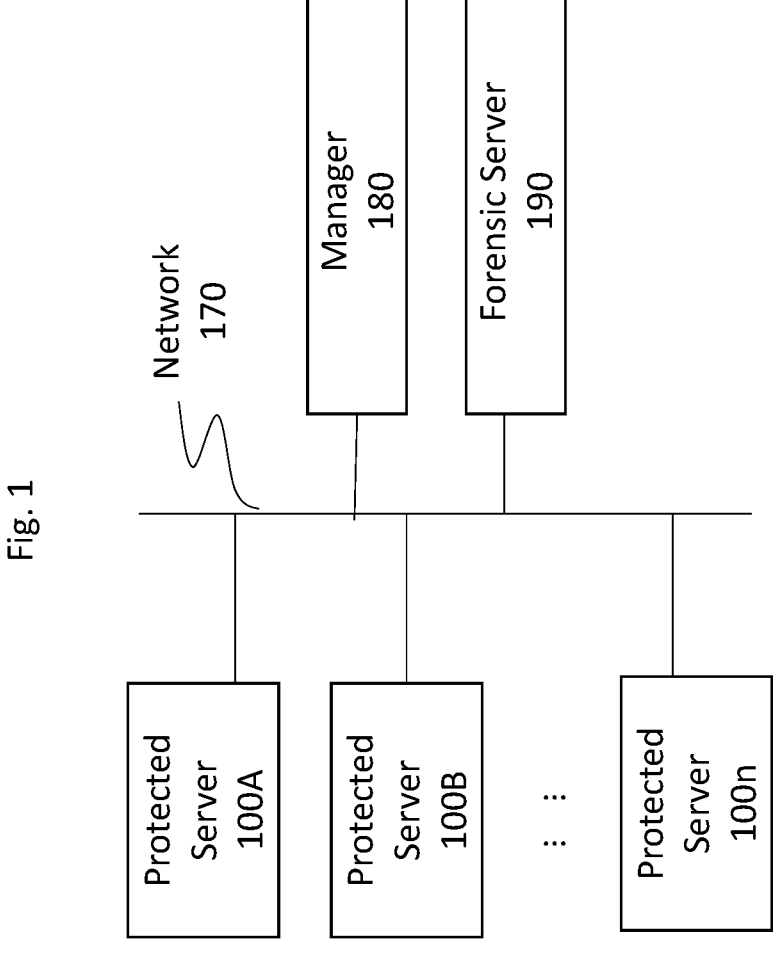
FIG. 1 illustrates an example deployment of protected servers utilizing malware-resistant memory capture, according to some embodiments of the presently disclosed subject matter.

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "computing", "comparing", "detecting", "collecting", "determining", "calculating", "receiving", "providing", "obtaining", "storing", "copying" or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the processor, mitigation unit, and inspection unit therein disclosed in the present application.

The terms "non-transitory memory" and "non-transitory storage medium" used herein should be expansively construed to cover any volatile or non-volatile computer memory suitable to the presently disclosed subject matter.

The operations in accordance with the teachings herein may be performed by a computer specially constructed for the desired purposes or by a general-purpose computer specially configured for the desired purpose by a computer program stored in a non-transitory computer-readable storage medium.

Embodiments of the presently disclosed subject matter are not described with reference to any particular programming language. It will be appreciated that a variety of programming languages may be used to implement the teachings of the presently disclosed subject matter as described herein.

Some types of malware have a capability to "hide themselves" to avoid detection. For example, malware known as "rootkits" hide by compromising the conduit between an OS and its users (see for example Embleton et. al. "SMM Rootkits: A New Breed of OS Independent Malware") When an OS user performs an OS function that could result in the malware being detected (for example: reading from a particular memory location), the malware can alter the behavior of the OS function so that an incorrect memory read value is returned, thus preventing detection of the malware by the OS user.

More generally, rootkits and related malware can intercept and alter communications of OS and hardware components to hide files, processes and/or network connections.

Some systems perform forensic analysis on runtime contents memory of a computer system. Some systems do this by utilizing Direct Memory Access (DMA) to transfer current system memory to a separate memory location for analysis, but DMA (or the instructions to perform DMA) can themselves be compromisable by rootkits or other malware.

It could be desirable to capture memory from memory units over a backchannel provided by a secondary bus. This approach however could require complex circuitry for decoupling memory units from the malware-vulnerable processor and coupling them to a dedicated controller to perform backchannel capture (and then recoupling to the original processor). Moreover, the memory unit would then be unavailable to the original processor during the backchannel capture.

Non-Volatile Dual In-line Memory Modules (NVDIMMs) are, in some examples, widely available cost-effective devices which merge dynamic random access memory (DRAM) and Flash technologies—for example: to solve problems of data volatility in mission critical servers (see for example: www.snia.org/sites/default/files/NVDIMM % 20Technical %20Brief %20January %202014. pdf).

During normal operation, an NVDIMM can function as a regular Dual In-line Memory Modules (DIMM). Each NVDIMM can have its own on-DIMM controller that, when the NVDIMM senses a power failure, immediately copies all data from DRAM into flash. When power is restored, the NVDIMM copies the data from flash back into DRAM and normal operation resumes with no data loss.

In some examples, the HW SAVE #bus signal triggers the backup (in which the data is written either thru side band signals or an inter-integrated circuit (I2C) interface).

Memory mirroring is a high-performance computing technique in which a computer is configured so that two (or more) memory units provide distinct redundant memory "channels". The processor of the computer can then write all data to both channels, and the data can then be stored in both (or all) mirroring memory units. In some server systems, memory mirroring is utilized to ensure that processing can continue in the event of failure of a memory unit (see for example: www.intel.com/content/www/us/en/developer/articles/technical/address-range-partial-memory-mirroring.html). In some examples, mirroring can be performed on a subset of memory addresses within a memory unit. In some examples, regions of multiple memory units can be mirrored to different regions of a memory unit that is dedicated to mirroring.

Some embodiments of the presently disclosed subject matter provide a system that includes NVDIMMs or similar technology in a mirrored memory configuration, to provide malware-resistant realtime memory capture, without complexity of decoupling/recoupling memories, as will be described in detail hereinbelow.

Attention is now drawn to FIG. 1, which illustrates an example deployment scenario of servers employing malware-resistant memory capture, in accordance with some embodiments of the presently disclosed subject matter.

Protected servers 100A 100B 100*n* can be computer servers that employ malware-resistant memory capture. Protected servers 100A 100B 100n can be operably connected (e.g. via a computer network) to manager 180 and forensic server 190.

In some embodiments, protected servers 100A 100B 100n communicate with manager 180 and forensic server 190 via a local area computer network. In some embodiments, manager 180 and forensic server 190 are located remotely e.g. in a server farm or a cloud provider.

Manager 180 can be a local or remote computer or other device (e.g. a smartphone or tablet) which transmits control commands to protected servers 100A 100B 100n. These control commands can signal protected servers 100A 100B 100n to, for example, perform a partial or total memory capture (as will be described hereinbelow). Manager 180 can signal protected servers 100A 100B 100n to capture memory—for example—periodically, or in response to a security alert or some other event.

Forensic server 190 can be a server which receives memory captures (e.g. via a computer network) from protected servers 100A 100B 100n, and stores the captures for forensic analysis (malware detection etc.)

In some embodiments, manager 180 and forensic server 190 can be the same machine.

Figure 2:
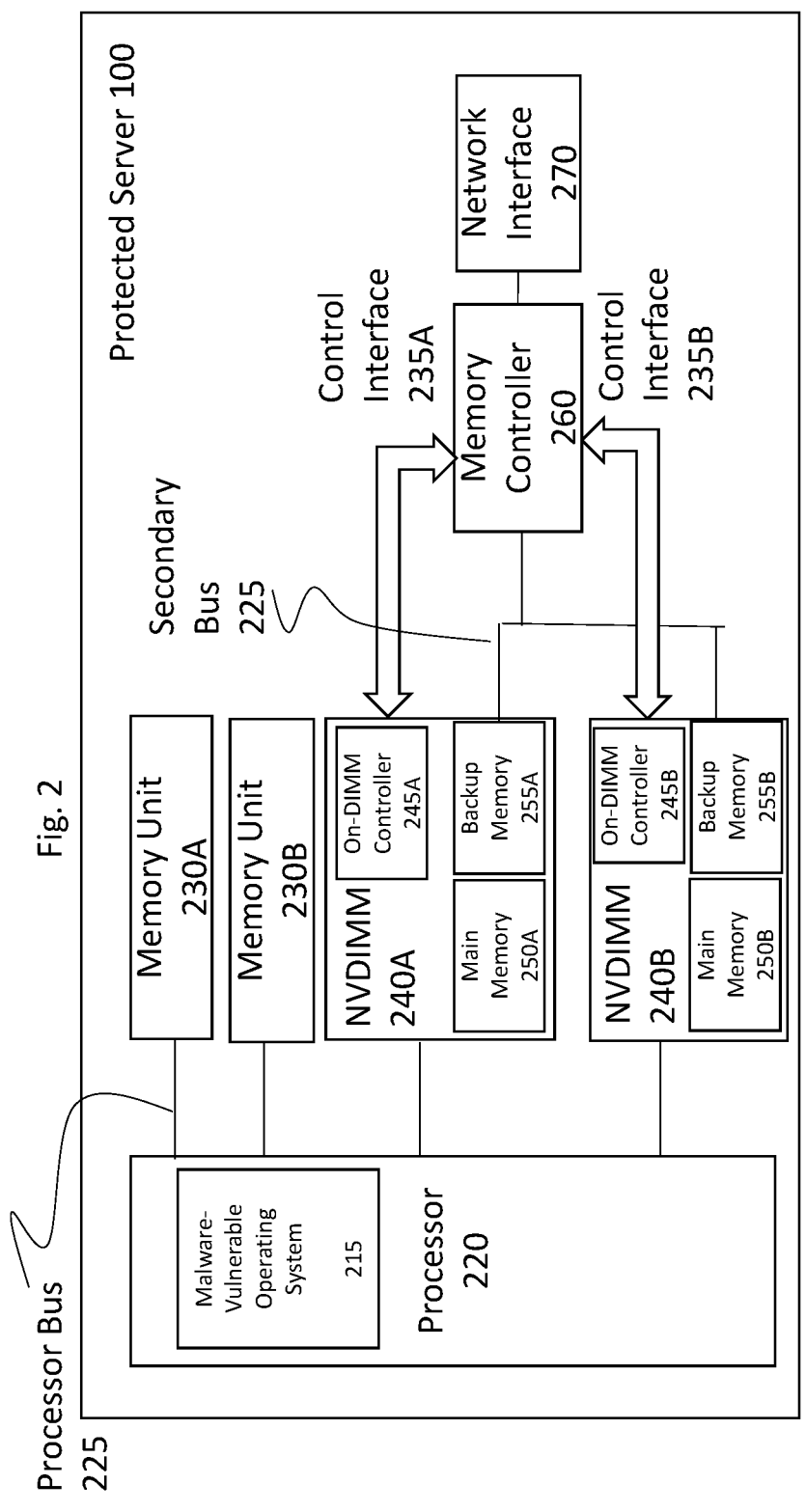
FIG. 2 illustrates a block diagram of an example protected server utilizing malware-resistant memory capture, according to some embodiments of the presently disclosed subject matter.

Attention is now directed to FIG. 2, which illustrates a block diagram of an example architecture of a protected server implementing malware-resistant memory capture, in accordance with some embodiments of the presently disclosed subject matter.

Protected server 100 can be a suitable type of computer or motherboard etc. and can include processor 220.

Processor 220 can be a suitable hardware-based electronic device with data processing capabilities, such as, for example, a general-purpose processor, digital signal processor (DSP), a specialized Application Specific Integrated Circuit (ASIC), one or more cores in a multicore processor etc. Processor 220 can also consist, for example, of multiple processors, multiple ASICs, virtual processors, combinations thereof etc.

Malware-vulnerable operating system 215 can be, for example, any kind of general-purpose or specialized operating system (e.g. Microsoft™ Windows, Linux etc.). Malware-vulnerable operating system 215 can also be, for example, a specialized application running on bare-metal processor 220. It is noted that if a forensics or anti-malware program is executed on malware-vulnerable operating system 215, then the malware may in fact have the capability to escape detection using techniques such as described hereinabove.

Memory units 230A 230B can be, for example, a suitable type of storage (e.g. volatile random access memory such as Double Data Rate 4 (DDR4)), and can include, for example, a single physical memory component or a plurality of physical memory components. Memory units 230A 230B can also be or include virtual memory. Memory units 230A 230B can be configured to, for example, store various data used in computation. It is noted that while FIG. 2 shows two memory units, some embodiments of the presently disclosed subject matter include more or fewer memory units.

Processor 220, memory units 230A 230B, and other components can be operably connected to processor bus 225. Processor bus 225 can be e.g. a DDR4 Registered Dual In-line Memory Module (RDIMM) interface or other suitable bus. In some embodiments, processor bus 225 includes distinct physical data connections between processor 220 and memory units 230A 230B (and also NVDIMM 240A 240B). In some other embodiments, processor bus 225 includes a shared bus.

NVDIMM 240A 240B can be suitable non-volatile Dual In-line Memory Module devices. Each NVDIMM 240A 240B can include, for example, main memory 250A 250B, backup memory 255A 255B, and on-DIMM controller 245A 245B.

Main memory 250A 250B of NVDIMM 240A 240B can be, for example, DDR4 or another type of suitable high-speed volatile memory. Backup memory 255A 255B of NVDIMMs 240A 240B can be, for example, non-volatile memory such as flash memory.

On-DIMM controller 245A 245B can be a memory controller, included within the NVDIMM, which executes methods in response to (for example) commands received over control interface 235A 235B. In some embodiments, an on-DIMM controller (e.g. on-DIMM controller 245A) can (for example: in response to a suitable control command) copy some or all data from main memory 250A to backup memory 255A. In some embodiments, an on-DIMM controller (e.g. on-DIMM controller 245A) can (for example: in response to a suitable control command) copy some or all of backup memory 255A to main memory 250A.

In some examples, a particular signal on control interface 235A 235B triggers the copy from main memory 250A to backup memory 255A (in which the data is written either thru side band signals or an inter-integrated circuit (I2C) interface). In some such examples, a low voltage on a dedicated bus pin triggers the copy. In some such examples, a high voltage on the same dedicated bus pin then triggers restore of data from backup memory 255A to main memory 250A. In some examples, loss of power on control interface 235A 235B can trigger the copy from main memory 250A to backup memory 255A.

NVDIMM 240A 240B can be operably connected to processor 220—for example via processor bus 225. NVDIMM 240A 240B can receive data (for example written by processor 220 to processor bus 225) and store the data to main memory 250A 250B. NVDIMM 240A 240B can receive data read requests (for example written by processor 220 to processor bus 225) and return appropriate data from main memory 250A 250B.

NVDIMM 240A 240B can provide a data interface for accessing backup memory 255A 255B. In some embodiments, NVDIMM 240A 240B provides Universal Serial Bus (USB) data interface for access to the data stored in backup memory 255A 255B. In some embodiments, backup memory 255A 255B itself is accessible via a data interface such as RDIMM. In some embodiments, the data interface for accessing backup memory 255A 255B is operably connected to secondary bus 225. In some embodiments, secondary bus 225 is a USB bus.

NVDIMM 240A 240B can provide a control interface for management functions such as initiating copying of data from main memory to backup memory 255A 255B. In some embodiments, NVDIMM 240A 240B provides a control interface consisting of one or more pins.

It is noted that while FIG. 2 shows two NVDIMMs, some embodiments of the presently disclosed subject matter include more or fewer NVDIMMs.

The term "secondary-storage-enabled memory unit" (SSEMU) can refer to a device which (like an NVDIMM) includes both memory for read/write access by a processor (i.e. main memory) and a backup memory, supports copying of data from main memory to backup memory (for example: in response to a control interface signal), and includes a data interface for accessing the backup memory. In some embodiments of the presently disclosed subject matter, one or more non-NVDIMM SSEMUs can be utilized.

In some embodiments, protected server 100 (e.g. processor 220) is configured so that each NVDIMM 240A 240B mirrors a respective memory unit 230A 230B (memory mirroring is described above). For example: in FIG. 2 NVDIMM 240A can mirror memory unit 230A and NVDIMM 240B can mirror memory unit 230B.

Memory controller 260 can be any kind of a suitable processor (for example: as described above for processor 220). Memory controller 260 can communicate with NVDIMMs 240a 240B (e.g. data interfaces for accessing the respective backup memories 255A 255B) via (for example) secondary bus 225. In some embodiments, memory controller 260 can signal commands to NVDIMMs 240a 240B via control interfaces 235A 235B. For example: memory controller 260 can signal NVDIMMs 240a 240B to copy stored data from main memory 250A 250B to backup memory 255A 255B. By way of further example: memory controller 260 can initiate data transfer from non-volatile memory of NVDIMMs 240a 240B to forensic server 190 via network interface 270.

Memory controller 260 can receive commands from manager 180 via network interface 270. For example: memory controller 260 can receive a command from manager 180 to capture running memory.

Figure 3:
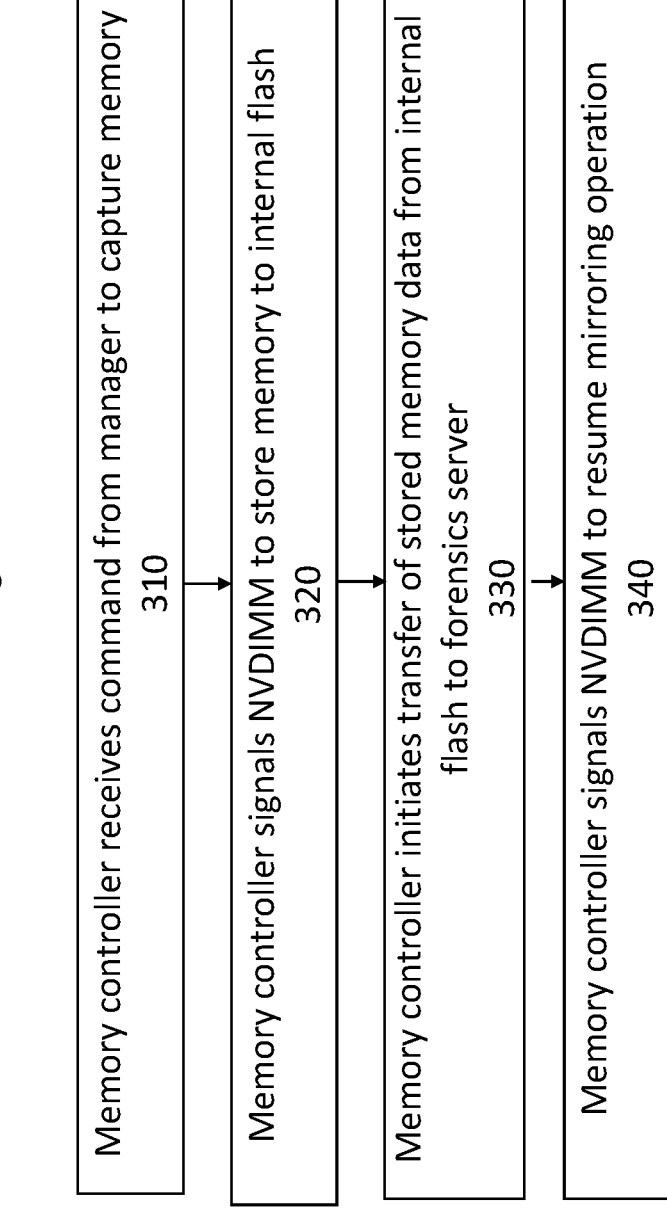
FIG. 3 illustrates flow diagram of an example method of malware-resistant memory capture, according to some embodiments of the presently disclosed subject matter.

Attention is now directed to FIG. 3, which illustrates a flow diagram of an example method of malware-resistant memory capture, in accordance with some embodiments of the presently disclosed subject matter.

Memory controller 260 can receive (310) a command from (for example) manager 180 via network 170. The command can, for example, instruct memory controller 260 to capture, for example, some or all memory on some or all memory units 230A 230B of, for example, the computer in which memory controller 260 is located.

Memory controller 260 can identify one or more NVDIMMs 240A 240B (or more generally: one or more NVSEMUs)—which mirror the data indicated by the capture command that memory controller 260 received from manager 180.

It is noted that in some embodiments memory controller 260 does not receive a command to capture memory. It is noted that in some embodiments the command received by memory controller 260 can include more, fewer, or different types of data, or the command may be received from an origin other than manager 180.

Memory controller 260 can then signal (320)—for example: via control interface 235A 235B—to the identified NVDIMM(s) 240A 240B memory to copy data from main memory 250A 250B to backup memory 255A 255B. For example: memory controller 260 can signal a control interface signal of copying of stored data (from—for example—main memory) to backup memory, as described above with reference to FIG. 2.

It is noted that the term "signaling" (or "signaling a control interface signal") as utilized herein can include removing power from an NVDIMM control interface, or other suitable methods of causing an NVDIMM (or more generally NVSEMU) to copy stored data (from—for example—main memory) to backup memory.

It is noted that protected server 100 can continue regular operation during a memory capture procedure, as memory units 230A 230B are functioning as usual.

Memory controller 260 can next initiate (330) transfer of stored memory data from NVDIMM backup memory 255A 255B to forensics server 190 (for example via a network direct memory access (DMA) transfer controlled by a DMA controller (not shown)).

More generally: memory controller 260 can initiate reading of data from NVDIMM backup memory 255A 255B (for example: by reading the data directly from the provided data interface via secondary interface 225, or by initiating DMA transfer). In some embodiments, memory controller 260 performs the forensic analysis locally. In some embodiments, memory controller 260 writes data that was read to, for example, forensics server 190.

Memory controller 260 can then signal (340) NVDIMMs 240A 240B (or in some other embodiments, to one or more NVSEMUs) to, for example, resume mirroring operation.

It is noted that presence of malware such as a rootkit on a computer operating system cannot affect or disrupt the memory capture procedure described in FIG. 3, as the method captures data via a back channel.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

The invention claimed is:

1. A computer system of malware-resistant memory capture, the system comprising:

a) one or more memory units, each of the one or more memory units being operably connected to a first processor;

b) at least one secondary-storage-enabled memory unit (SSEMU), comprising:

i) a volatile random access main memory, and a first data interface of, at least, writing to the volatile random access memory, ii) a backup memory, and a second data interface of, at least, reading from the backup memory, the SSEMU being adapted to copy data stored in the comprised volatile random access main memory to the comprised backup memory, via a third data interface, responsive to, at least, a signal received on a control interface, the first, second, and third data interfaces being distinct;

each SSEMU being operably connected to the first processor and configurable to store data from the first processor to the volatile random access main memory, at least one SSEMU being adapted to copy comprised main memory data to the comprised backup memory responsive to a control interface signal comprising a low voltage on a dedicated bus pin, thereby enabling a given SSEMU to conduct memory mirroring operations upon data of the first processor, concurrent with a manager or controller reading data from the backup memory of the given SSEMU; and c) a memory controller (MC) operably connected to a respective control interface of at least one of the SSEMUs, the MC being configurable to:

signal, to a respective SSEMU, a control interface signal of copying of comprised main memory data to comprised backup memory, by setting the low voltage on the dedicated bus pin.

2. The system of claim 1, wherein the computer system is configurable to enable at least one SSEMU to at least partially mirror at least one of the memory units.

3. The system of claim 1, wherein the MC is configurable to perform the signaling responsive to an instruction from a manager that is operably connected to the MC via a network.

4. The system of claim 1, wherein the MC is configurable to initiate transfer of data from: the second data interface of a respective SSEMU to:

a forensic server, thereby enabling transfer of SSEMU data to the manager, concurrent to SSEMU storing data from the first processor.

5. The system of claim 1, wherein the comprised backup memory of at least one of the SSEMUs is flash memory.

6. The system of claim 1, wherein the third data interface of at least one SSEMU utilizes at least one of: sideband signals, and an inter-integrated circuit interface.

7. The system of claim 1, wherein at least one SSEMU is a non-volatile Dual In-line Memory Module (NVDIMM).

8. The system of claim 1, wherein the second data interface of at least one SSEMU is a universal serial bus (USB) data interface.

9. A processor-based method of malware-resistant memory capture, the method comprising:

a) providing one or more memory units, each of the one or more memory units being operably connected to a first processor;

b) providing at least one secondary-storage-enabled memory unit (SSEMU), comprising:

i) a volatile random access main memory, and a first data interface of, at least, writing to the volatile random access memory, ii) a backup memory, and a second data interface of, at least, reading from the backup memory, the SSEMU being adapted to copy data stored in the comprised volatile random access main memory to the comprised backup memory, responsive to, at least, a signal received on a control interface, each SSEMU being operably connected to the first processor and configurable to store data from the first processor to the volatile random access main memory, at least one SSEMU being adapted to copy comprised main memory data to the comprised backup memory responsive to a control interface signal comprising a low voltage on a dedicated bus pin, thereby enabling a given SSEMU to conduct memory mirroring operations upon data of the first processor, concurrent with a manager or controller reading data from the backup memory of the given SSEMU; and c) signaling, by a memory controller, to a respective SSEMU, a control interface signal of copying of comprised main memory data to comprised backup memory, by setting the low voltage on the dedicated bus pin.

* * * * *